(12) United States Patent
Cyr et al.

(10) Patent No.: US 9,069,487 B2
(45) Date of Patent: *Jun. 30, 2015

(54) VIRTUALIZING STORAGE FOR WPAR CLIENTS USING KEY AUTHENTICATION

(75) Inventors: Michael P. Cyr, Georgetown, TX (US); James A. Pafumi, Leander, TX (US); Morgan J. Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/606,152

(22) Filed: Sep. 7, 2012

(65) Prior Publication Data
US 2012/0331256 A1 Dec. 27, 2012

Related U.S. Application Data

(63) Continuation of application No. 12/135,382, filed on Jun. 9, 2008, now Pat. No. 8,301,848.

(51) Int. Cl.
*G06F 12/00* (2006.01)
*G06F 3/06* (2006.01)
*G06F 9/50* (2006.01)

(52) U.S. Cl.
CPC ............ *G06F 3/0664* (2013.01); *G06F 3/0661* (2013.01); *G06F 3/061* (2013.01); *G06F 3/062* (2013.01); *G06F 3/067* (2013.01); *G06F 3/0671* (2013.01); *G06F 9/5077* (2013.01)

(58) Field of Classification Search
CPC . G06F 11/0712; G06F 9/5077; G06F 9/5083; G06F 3/0664; G06F 3/0061; G06F 3/062; G06F 3/067; G06F 3/0671
USPC .......... 711/154, 147, 202, 203, 170; 709/224, 709/225, 226; 714/E11.071
See application file for complete search history.

(56) References Cited

U.S. PATENT DOCUMENTS

| 6,061,349 A | 5/2000 | Coile et al. |
| 7,116,671 B2 | 10/2006 | Williams |
| 7,219,354 B1 | 5/2007 | Huang et al. |

(Continued)

FOREIGN PATENT DOCUMENTS

| JP | 2009-500702 A | 1/2009 |
| WO | WO 2006121211 | * 11/2006 |
| WO | WO2007/003448 A1 | 1/2007 |

OTHER PUBLICATIONS

ISR D.H. Brown Associates Inc.: "HP Virtual Server Environment Capitalizes on Workload Management Integration", Aug. 2004, http://h71028.www7.hp.com/enterprise/downloads/040816_HP_VSE_WLM.Pdf.*

(Continued)

*Primary Examiner* — Pierre-Michel Bataille
(74) *Attorney, Agent, or Firm* — Stephen J. Walder, Jr.; Damion Josephs

(57) ABSTRACT

Systems, methods and media for providing to a plurality of WPARs private access to physical storage connected to a server through a VIOS are disclosed. In one embodiment, a server is logically partitioned to form a working partition comprising a WPAR manager and individual WPARs. Each WPAR is assigned to a different virtual port. The virtual ports are created by using NPIV protocol between the WPAR and VIOS. Thereby, each WPAR has private access to the physical storage connected to the VIOS.

15 Claims, 4 Drawing Sheets

(56) References Cited

U.S. PATENT DOCUMENTS

| | | | |
|---|---|---|---|
| 7,222,150 B1* | 5/2007 | Phillips et al. | 709/202 |
| 7,343,421 B1 | 3/2008 | Goyal | |
| 7,496,790 B2 | 2/2009 | Arndt et al. | |
| 7,660,302 B2* | 2/2010 | McGlaughlin | 370/389 |
| 7,725,559 B2* | 5/2010 | Landis et al. | 709/215 |
| 7,855,957 B2 | 12/2010 | Madhi, II et al. | |
| 7,984,108 B2* | 7/2011 | Landis et al. | 709/215 |
| 8,381,209 B2* | 2/2013 | Reumann et al. | 718/1 |
| 2002/0129082 A1 | 9/2002 | Baskey et al. | |
| 2003/0147402 A1 | 8/2003 | Brahim | |
| 2003/0225859 A1 | 12/2003 | Radia et al. | |
| 2005/0262505 A1 | 11/2005 | Esfahany et al. | |
| 2007/0005820 A1 | 1/2007 | Banzhaf et al. | |
| 2007/0083643 A1 | 4/2007 | Arndt et al. | |
| 2007/0153697 A1 | 7/2007 | Kwan et al. | |
| 2008/0089295 A1 | 4/2008 | Keeler et al. | |
| 2008/0126579 A1 | 5/2008 | Corneli et al. | |
| 2008/0163239 A1* | 7/2008 | Sugumar et al. | 718/105 |
| 2008/0172554 A1 | 7/2008 | Armstrong et al. | |
| 2009/0307444 A1 | 12/2009 | Cyr et al. | |

OTHER PUBLICATIONS

USPTO U.S. Appl. No. 12/135,382.
USPTO U.S. Appl. No. 13/606,193.
USPTO U.S. Appl. No. 13/606,247.
USPTO U.S. Appl. No. 13/606,521.
Chen, Jianxi et al., "VISA: A Virtual Interface Storage Architecture for Improved Network Performance", Proceedings of the Second International Conference on Embedded Software and Systems, ACM Digital Library, Dec. 2005, 6 pages.
Huo, Zhigang et al., "High Performance Sockets over Kernel Level Virtual Interface Architecture", Eighth International Conference on High-Performance Computing in Asia-pacific Region, IEEE Electronic Library Online, 2005, 7 pages.
Lim, Jung Youl et al., "A Dynamic Load Balancing Model for Networked Virtual Environment Systems Using an Efficient Boundary Partition Management", Electronics and Telecommunication Research Institute, Korea, Feb. 20-22, 2006, pp. 727-730.
Japanese Office Action Rejection dated Aug. 20, 2013, Japanese Patent Application No 2011-512152, Translation unavailable. 2 pages.
Office Action mailed Nov. 20, 2013, for U.S. Appl. No. 13/606,247; 11 pages.
IBM, "Introduction to Workload Partition Management in IBM AIX Version 6.1" p. 6,7,10,20-22,25,26, [Online] Nov. 2007, IBM International Technical Support Organization, [retrieved on Aug. 12, 2013] Internet <URL:http://www.redbooks.ibm.com/redbooks/pdfs/sg2474, 14 pages.
Nakano, Jun, IBM System P Server Niokeru Kasouka (Virtualization in IBM System p server), UNIX Magazine, Ascii Corporation, Jan. 1, 2007, vol. 22, No. 1, Issue 237, 15 pages.
International Search Report and Written Opinion dated Sep. 7, 2009 for International Application No. PCT/EP2009/057017, 11 pages.
Baboescu, Florin et al., "A Tree Based Router Search Engine Architecture with Single Port Memories", Proceedings of the 32nd International Symposium on Computer Architecture, Jun. 2005, pp. 1-11.
Blanchard, Bruno et al., "Introduction to Workload Partition Management in IBM AIX Version 6.1: Chapters 1 & 2", IBM Redbooks —SG24-7431-00, [Online] Nov. 1, 2007, XP002541514, Retrieved from the Internet: URL: http://www.redbooks.ibm.com/redbooks/pdfs/sg247431.pdf> [retrieved on Aug. 12, 2009], 298 pages (see pp. 6-7. figure 1.2, pp. 10, 20-22, and 25-26).
Day, Brad et al., "Virtualization Trends on IBM's System P—Unraveling the Benefits in IBM's Power VM", [Online] Feb. 5, 2008, XP007909506, Retrieved from the Internet: URL: ftp://ftp.software.ibm.com/common/ssi/sa/wh/n/po103002usen/POL03002USEN.PDF>, [retrieved on Aug. 10, 2009], 8 pages (see whole document).

\* cited by examiner

US 9,069,487 B2

VIRTUALIZING STORAGE FOR WPAR CLIENTS USING KEY AUTHENTICATION

This application is a continuation of application Ser. No. 12/135,382, filed Jun. 9, 2008, now U.S. Pat. No. 8,301,848.

BACKGROUND

This written description is in the field of access to physical memory in a server. More particularly, the description relates to providing private physical storage for Work load Partitions (WPAR) in a server.

Many different types of computing systems have attained widespread use around the world. These computing systems include personal computers, servers, mainframes an a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet browser, photo-shop, games, anti-virus, as well as a host of other application programs too numerous to mention.

Servers are provided to connect a plurality of computers to the Internet or an intranet. Each server may be logically partitioned into a plurality of virtual clients which act and appear to a computer connected to the server as if the virtual client is itself a server. Each virtual client has access memory external to the server such as in a Storage Area Network (SAN). To provide this access a Power Hypervisor (PHYP) controls access of each, virtual client to the physical storage through a Virtual Input/Output Server (VIOS), which is itself a logical partition.

Disks and optical devices attached to a physical adapter connected to the Virtual I/O Server logical partition, can be shared by one or more client logical partitions. The Virtual I/O Server may be a standard storage subsystem that provides standard Small Computer Service Interface (SCSI)-compliant Logical Unit Numbers (LUN). The Virtual I/O Server is capable of exporting a pool of heterogeneous physical storage as a homogeneous pool of block storage in the form of SCSI disks. On high end servers many customers are moving toward having all of their storage located on the Storage Area Network (SAN). The SAN may include storage devices connected by way of Fibre Channel or SCSI (Small Computer System Interface).

On some systems, the server may be logically partitioned and a logical partition (LPAR) can be sub-partitioned into a plurality of Work load Partitions (WPAR). Within the logical partition is a WPAR manager, which is itself a sub-partition of the logical partition. The WPAR manager performs management tasks including controlling access of a WPAR to shared file systems. In such a configuration, each WPAR provides an isolated environment to execute different applications.

Multiple WPARs use a common operating system to perform their functions and the WPAR Manager will typically use the same operating system as the WPARs. File system access that may be shared by each WPAR is provided by the WPAR manager which sees the physical storage that is connected to a VIOS of the server. If a WPAR needs private storage, the WPAR manager provides storage that is available from the network by way of a network file system.

BRIEF SUMMARY

The present invention provides systems, methods and media for providing private access to physical storage memory to WPARs using NPIV. One embodiment is a system for providing to each of a plurality of Working load Partitions (WPAR) in a server access to physical storage through a Virtual Input/Output Server (VIOS) of the server. The system comprises a server with a processor to execute software to create a logical partition comprising at least one WPAR and a WPAR manager which controls access of each WPAR to the physical storage. The access is provided through, virtual ports connected to the VIOS using Mode Port Identification Visualization (NPIV) protocol so that each WPAR has access to its own private memory of the physical storage.

The system may further comprise a Virtual Fiber Channel (VFC) adapter created by software executed by the processor, the VFC associated with a virtual port identification. The system may also comprise, within the VIOS, a server adapter created by software executed by the processor, the server adapter associated with a virtual port identification. The system may further comprise an authenticator created by software executed by the processor to authenticate a memory transaction initiated by a WPAR.

Another embodiment is a method to provide to each Of a plurality of Working load Partitions (WPAR) in a server access to physical storage through a Virtual Input/Output Server (VIOS) of the server. The method comprises receiving by a WPAR manager a request from a WPAR to perform a memory transaction. The method further comprises connecting the requesting WPAR through a virtual port assigned to the WPAR and connected to the VIOS using Node Port Identification Visualization (NPIV) protocol to give the requesting WPAR private access to the physical storage, in some embodiments, the method comprises authenticating the request from the requesting WPAR. Authenticating may comprise comparing a key stored by the WPAR manager and a key sent by the requesting WPAR.

Another embodiment is a computer program product comprising a computer useable medium having a computer readable program, wherein the computer readable program when executed on a computer causes the computer to provide to each of a plurality of Working load Partitions (WPAR) in a server access to physical storage through a Virtual Input/ Output Server (VIOS) of the server. The operations include receiving by a WPAR manager a request from a WPAR to perform a memory transaction. The operations further comprise connecting the requesting WPAR through a virtual port assigned to the WPAR and connected to a Virtual I/O Server (VIOS) using Mode Port Identification Visualization (NPIV) protocol to give the requesting WPAR private access to the physical storage.

BRIEF DESCRIPTION OF THE SEVERAL VIEWS OF THE DRAWINGS

Advantages of the invention will become apparent upon reading the following detailed description add upon reference to the accompanying drawings in which, like references may indicate similar elements.

DETAILED DESCRIPTION OF EMBODIMENTS

The following is a detailed description of example embodiments depicted in the accompanying drawings. The example embodiments are described in detail. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art.

Systems, methods and media for providing to a plurality of WPARs private access to physical storage connected to a server through a VIOS are disclosed. In one embodiment, a server is logically partitioned to form a working partition comprising a WPAR manager and individual WPARs. Each WPAR is assigned to a different virtual port. The virtual ports are created by using NPIV protocol between the WPAR and VIOS. Thereby, each WPAR has private access to the physical storage connected to the VIOS.

Figure 1:
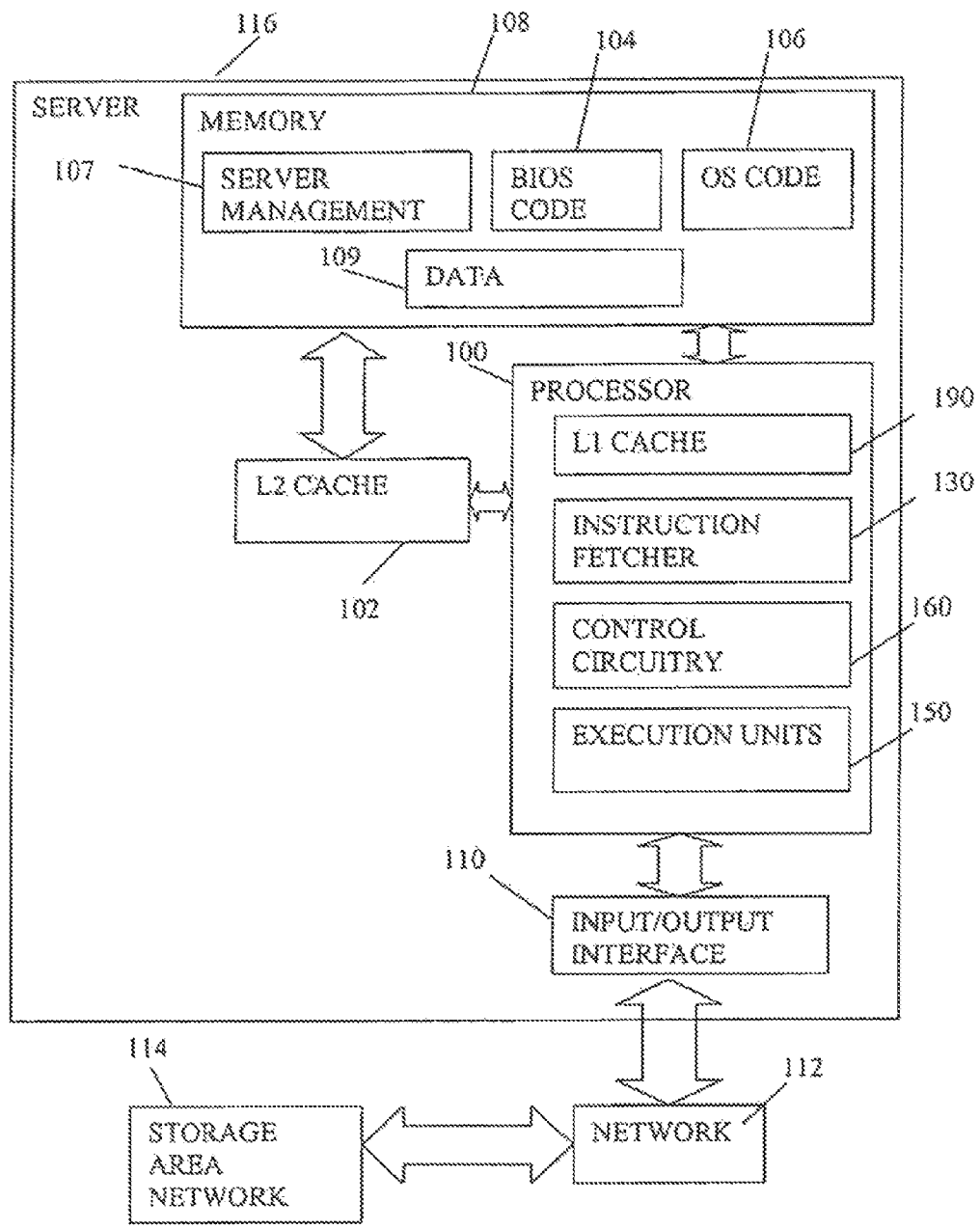
FIG. 1 depicts an embodiment of a server within a network; the server can emulate virtual clients and VIOS.

FIG. 1 shows a server 116 (herein sometimes referred to as a machine). Server 116 comprises at least one processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of server 116. Digital system 116 comprises a level 2 (L2) cache 102 located physically close to processor 100. Memory 108 also stores other programs for execution by processor 100 and stores data 109.

In an embodiment, memory 108 stores server management code 107 to manage and control access to physical memory storage, to maintain logical, partitions, to implement the VIOS, the PHYP, and other functions. In some embodiments, multiple virtual clients can be emulated by a single processor. In some embodiments, more than one processor in the server may emulate a single virtual client. Each virtual client may appear as a server to a computer or other device connected to server 116. Each virtual client may execute application programs. These application programs may comprise, for example, a database. The database may then be accessed by a computer connected to a network served by the server. In some embodiments, the application code itself may reside on a physical paging device connected to the server. The physical paging device may be connected to multiple servers.

In some embodiments server management code 107 creates a working logical partition. The code further partitions this logical partition into a WPAR manager and WPAR, which are all sub-partitions of the logical partition. The code 107 also creates a VIOS. The WPAR manager and the VIOS communicate using Node Port ID Virtualization (NPIV) to create virtual ports that can be assigned to each WPAR. The VIOS is connected to physical storage through a physical adapter. Thus, each WPAR is provided private access to physical storage by way of a virtual port created according to NPIV protocol. Server code 107 may be stored on a hard drive of the server.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. Execution units 150 may comprise load/store units, integer Arithmetic/Logic Units, floating point Arithmetic/ Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to implement the code of server management code 107.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Server 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Processor 100 may also communicate with a network 112 by way of Input/Output Device 110. The network connects server 116 with a storage area network of physical memory storage devices 114. These devices may include tape drive storage or hard disk arrays or other types of memory.

Thus, in one mode of operation of server 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache. Typically, the closer to the processor the memory is, the more expensive it is and the faster it operates.

Execution units 150 execute the instructions received from the L1 cache 190. Each of the units of execution units 150 may be adapted to execute a specific set of instructions, instructions can be submitted to different execution units for execution in parallel. Data processed by execution units ISO are storable in and accessible from integer register files and floating point register files (not shown.) Data stored in these register files, can also come from or be transferred to on-board L1 cache 190 or an external cache or memory. The processor can load data from memory, such as L1 cache, to a register of the processor by executing a load instruction. The processor can store data into, memory from a register by executing a store instruction.

A server 116 will have its own memory for storing its operating system, BIOS, and the code for executing application program and encryption key processing code, as well as files and data. The memory of a sewer comprises Read-Only-Memory (ROM), cache memory implemented in SRAM and SEAM, a hard disk drive, CD drives and DVD drives. A server also has its own memory and may control access to other memory such as tape drives and hard disk arrays. Each server may store and execute its own application programs. Thus, some application programs, such as databases, may reside in the server and those programs may be available to computers in the network. Further, the server may be connected through one or more ports to a local storage area network (SAN). The SAN may comprise magnetic disks of differing types and speeds.

As noted server 116 may store computer code 107 to perform the various functions of the server, including, forming logical partitions (LPAR), emulating virtual clients which may each appear as a server to external devices such as computers in the network, emulating a Power Hypervisor (PHYP), and a Virtual I/O Server (VIOS). Computer code 107 is executed to create WPARs and a WPAR manager as well as a VIOS, and further, establishes communication between the WPAR manager and the VIOS according to NPIV protocol to enable the WPARs to privately access the physical storage.

Figure 2:
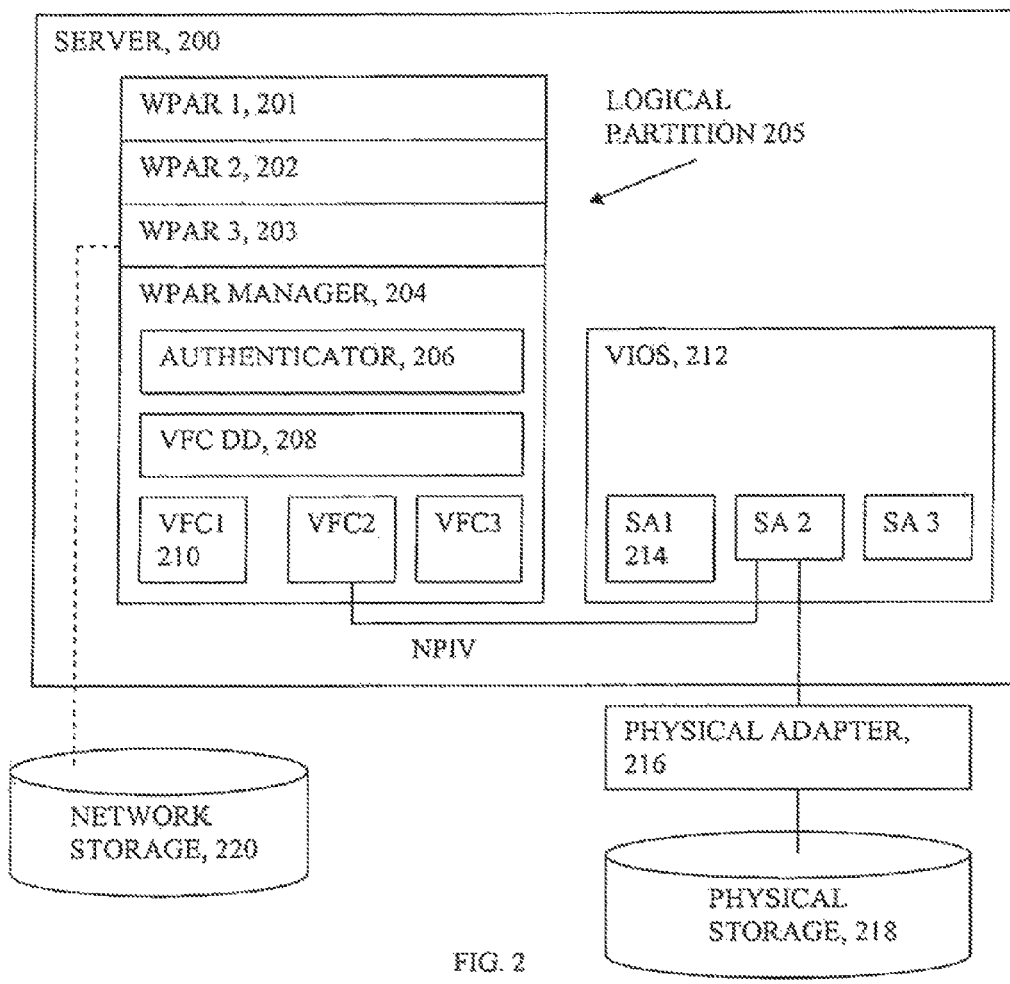
FIG. 2 depicts an embodiment of a system using Node Port ID Visualization (NPIV) to provide private memory access to a plurality of WPARs.

FIG. 2 shows a system according to one embodiment. A server 200 comprises a logical partition 205 and a VIOS 212. Logical partition 205 comprises a plurality of Work load Partitions (WPAR) 201, 202, 203 and a WPAR Manager 204. A function of WPAR manager 204 is to control access of the WPARs to memory. In some embodiments, WPAR manager 204 can provide memory access to the WPARs in three ways. One way is to shown by the logical connection (shown by dashed line in FIG. 2) between WPAR 3 and network storage 220. Thus, one way is to provide private storage to a WPAR by giving it access to storage over the network on which the server operates. As far as the WPAR sees, it accesses memory as if it were accessing a directory on the server, except for the high latency it experiences from accessing memory over the network. A second way to provide memory to the WPAR is to provide shared memory of the physical storage 218. The WPAR does not see the physical adapter. As far as the WPAR sees, it reads and write from a local memory that is shared by the WPARs. The WPAR is not cognizant of the actual memory connections.

A third way to provide memory access to the WPARs is through the use of Node Port Identification Virtualization (NPIV). The first way of giving private access to a WPAR is neither efficient nor flexible. The second way of giving shared access is to have all physical disks in the WPAR Manager. Those disks are used to create a common shared filesystem for all WPAR Clients that need storage. Thus, if the WPAR Client needs private storage then a network filesystem can be used. However, using the network file system may cause delays and is exponentially slower than communicating directly with the I/O storage device. Another solution is desired.

With VIOS 212 support of Node Port ID Virtualization (NPIV), Fibre Channel port identifications can be virtualized in such a way that each port identification can now look like many port identifications. This is advantageous because these virtualized ports can now be assigned to different WPARs and the WPARs can have complete control over the disks that are connected to that virtual port. These connections are established between the WPAR manager and the VIOS using NPIV protocol. In traditional virtualized environments using the Virtual I/O Sever (VIOS) technology the virtual clients only see a virtual storage and have no idea about details to the physical storage being virtualized. NPIV allows the VIOS to virtualize the port identification and so now the WPARs can have a virtual path to die physical storage. A WPAR can now see all of the details of the physical storage because the storage is no longer being virtualized; only the path is virtualized. Using NPIV and a new code module for authentication allows the WPAR Client to use physical storage resources across the virtual port. The authentication ensures that a WPAR only accesses its own virtual port.

Thus, in an embodiment, an existing VIOS that supports NPIV technology is combined with an authentication module 206 in such a way that a WPAR has access to the physical storage across a virtual port. This provides a significant improvement over the method of using a networked filesystem. The authentication module 206 will run on the WPAR Managing Partition 204. Authenticator 206 creates an affinity between WPARs and a Virtualized Fibre Channel (VFC) Client Adapter 210. Each WPAR Client 201, 202, and 203 is mapped to a VFC by the Authenticator.

Once this is done a WPAR Client can now send I/O transactions. Authenticator 206 will ensure that those transactions only go to the corresponding VFC mapped to that WPAR. Authenticator 206 may produce an error message if a WPAR Client tries to send I/O to a VFC it is not mapped to. Thus, in some embodiments, there is a one to one mapping between a WPAR Client and a VFC-Server Adapter virtualized port. When this mapping is in place the WPAR Client has unique access to physical storage and no longer needs to use the network filesystem when it needs private storage. Access to the physical storage improves throughput and allows the WPAR Client to manage the storage itself. Thus, this method of providing to a WPAR private access to the physical storage is more efficient than providing storage over the network.

Accordingly, WPAR manager 204 comprises an authenticator 206, a VFC device driver 208, and multiple virtual fibre channels VFC 210. Each virtual channel is a logical port that is connected to a server adapter 214 of the VIOS 212. Server adapters 214 and Virtual fiber Channels 210 operate according to NPIV protocol to provide virtual ports for each WPAR 201, 202, 203. When a WPAR 201 initiates a read/write transaction to private memory on physical storage 218 through adapter 216, it sends a key to authenticator 206. In some embodiments, the key is identical to the virtual port identification. In other embodiments, a unique key is chosen at random.

Authenticator 206 compares the key received from WPAR 201 with a key stored in a memory allocated to authenticator 206 to determine if the key received from WPAR 201 is correct. If the key is correct, then the read/write transaction occurs over the virtual port that exists for WPAR 201. Thus, the data to be transferred passes to the WPAR manager to a VFC device drive 208, to a VFC 210, to a server adapter 214, to physical adapter 216, to physical storage 218. The WPAR can thus access private storage through a virtual port created using NPIV protocol.

Figure 3:
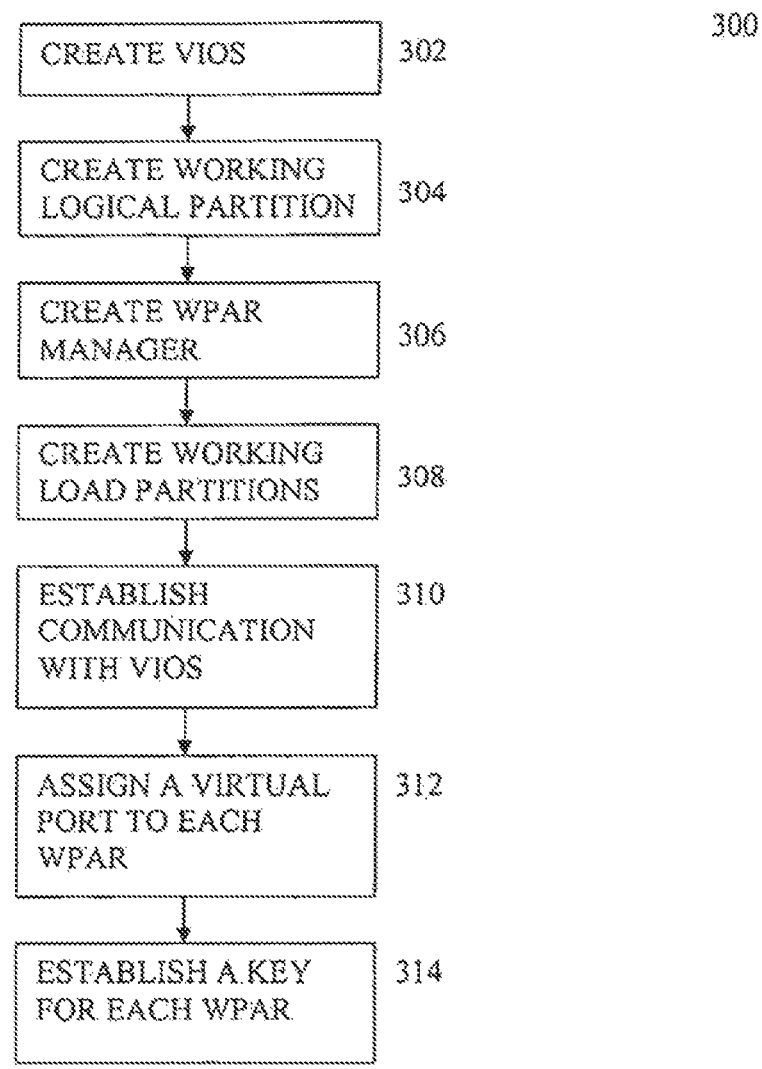
FIG. 3 depicts a flowchart of an embodiment for setting up for memory access using NPIV.

FIG. 3 shows an embodiment of a flow chart 300 for setting up a virtual port process within server 200. First, a VIOS is created (element 302). Then, a working logical partition is created to contain the WPARs and WPAR manager (element 304). The WPAR manager is also created (element 306). Then the WPARs themselves are created (element 308). In one embodiment, a single operating system governs the entire working logical partition. The system then establishes connections between the WPAR Manager and the VIOS using NPIV protocol (element 310). Then, the WPAR manager can assign a virtual port to each WPAR that is in existence (element 312). Finally, for authentication the WPAR manager assigns a key to each WPAR and forms a map linking a key to a virtual port assigned to the WPAR (element 314). In a different embodiment, each WPAR is informed of its virtual port identification and that is used as the key.

Figure 4:
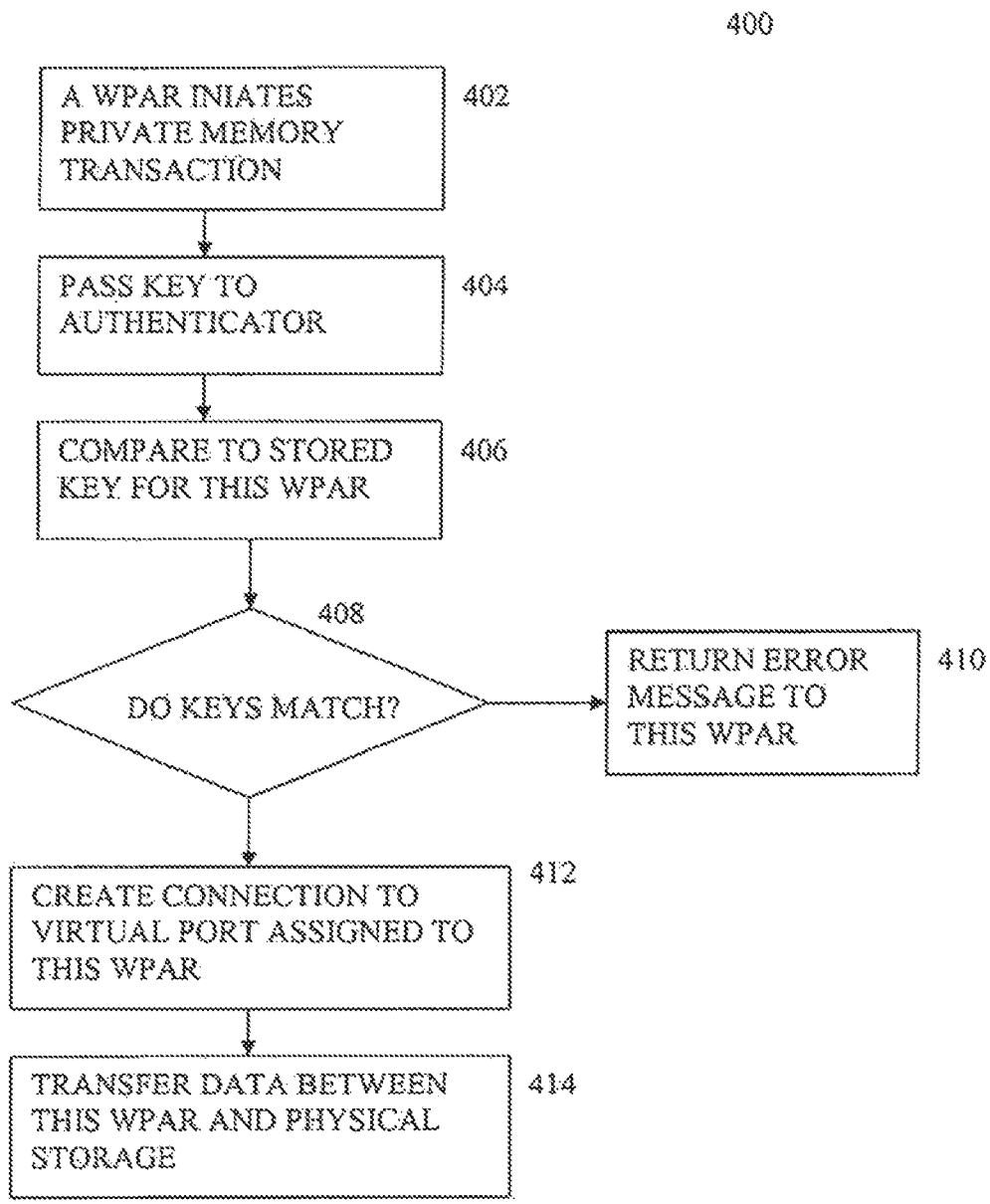
FIG. 4 depicts a flowchart of an embodiment for memory access by WPARS using NPIV.

FIG. 4 shows an embodiment of a flow chart 400 for controlling access of a WPAR to physical storage through NPIV protocol. During operation, a WPAR, which may be running an application program, may need to initiate a memory transaction (read or write) (element 402). The WPAR passes its key to the authenticator of the WPAR manager (element 404). In one embodiment, the WPAR manager stores a copy of the WPAR keys and maps each one to its own virtual port which is made available by way of NPIV protocol.

Thus, when the authenticator receives a key from a WPAR it compares that to a key the WPAR manager has stored for the WPAR (element 406). If the keys match (element 408), the WPAR manager establishes a connection to the WPAR and its virtual port (element 412). If the keys do not match, an error has occurred and the WPAR receives an error message from the WPAR manager (element 410). If the keys match, then data may be transferred over the established connection (element 414). In this way, each WPAR of the logical partition has access to its own private memory of the physical storage. This is faster and more efficient than providing private storage to the WPAR over the network.

Some embodiments can take the form of an entirely hardware embodiment, an entirely software embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection, with a server such as shown in FIG. 1, or any instruction execution system.

For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid, magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution, input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment is a computer program product comprising a computer useable medium having a computer readable program, wherein the computer readable program when executed on a computer causes the computer to provide to each of a plurality of Working load Partitions (WPAR) in a server access to physical storage through a Virtual Input/Output Server (VIOS) of the server. The operations include receiving by a WPAR manager a request from a WPAR to perform a memory transaction. The operations further comprise connecting the requesting WPAR through a virtual port assigned to the WPAR and connected to a Virtual I/O Server (VIOS) using Node Port Identification Virtual Nation (NPIV) protocol to give the requesting WPAR private access to the physical storage.

In some embodiments, the operations further comprise authenticating the request from the requesting WPAR. Authenticating may comprise comparing a key stored by the WPAR manager and a key sent by the requesting WPAR. In some embodiments, the operations comprise creating a WPAR manager to control access by WPARs to the physical storage memory connected to the server by the VIOS. Embodiments may also comprise creating a plurality of WPARs with each WPAR assigned to a virtual port. Thus, embodiments generally provide for private access of WPARs to the physical storage of a SAN connected to the server through a VIOS.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system for providing to each of a plurality of Working load Partitions (WPAR) in a server access to physical storage through a Virtual Input/Output Server (VIOS) of the server, comprising:
   a server with a processor to execute software to create a logical partition comprising at least one WPAR and a WPAR manager which controls access of each WPAR to the physical storage through virtual ports connected to the VIOS using Node Port Identification Virtualization (NPIV) protocol so that each WPAR has access to its own private memory of the physical storage;
   physical storage connected to the VIOS of the server through a physical adapter; and
   an authenticator created by software executed by the processor to authenticate a memory transaction initiated by a WPAR, wherein the authenticator is configured to authenticate a key value submitted by a WPAR against stored key values for the at least one WPAR, and wherein a data transfer between the WPAR and the physical storage, via the virtual port, is only performed in response to the authenticator determining the WPAR to be authentic based on results of the authentication of the key value.

2. The system of claim 1, further comprising, within the VIOS, a server adapter created by software executed by the processor, the server adapter associated with a virtual port identification of a Virtual Fiber Channel (VFC) adapter, and wherein the server adapter communicates data between the VIOS and a physical adapter coupled to the physical storage.

3. The system of claim 2, wherein the at least one WPAR comprises a plurality of WPARs, and wherein each of the WPARs is associated with a separate unique virtual port, and wherein each of the separate unique virtual ports associated with the WPARs is associated with the virtual port identification of the VFC.

4. The system of claim 1, further comprising network storage logically connected to a WPAR.

5. The system of claim 1, wherein the logical partition is divided into multiple WPARs, each of the multiple WPARs and the WPAR manager share a common operating system of the logical partition to perform their corresponding operations.

6. The system of claim 1, wherein each WPAR is capable to execute an application program, and wherein the WPAR is configured to access information about the physical storage without virtualization of the physical storage.

7. A method to provide to each of a plurality of Working load Partitions (WPAR) in a server access to physical storage through a Virtual Input/Output Server (VIOS) of the server, comprising:
   receiving, by a WPAR manager of the server, a request from a requesting WPAR of a logical partition of the server, to perform a memory transaction;
   connecting the requesting WPAR through a virtual port, assigned to the WPAR and connected to the VIOS using Node Port Identification Virtualization (NPIV) protocol, to a physical storage to give the requesting WPAR private access to the physical storage;
   performing the memory transaction between the WPAR and the physical storage via the virtual port assigned to the WPAR; and
   authenticating the request from the requesting WPAR, wherein authenticating the request from the requesting WPAR comprises authenticating a key value submitted by the requesting WPAR with the request against stored key values for the plurality of WPARs of the server, and wherein the memory transaction is performed only in response to the authentication of the request resulting in the requesting WPAR indicating that the requesting WPAR is authentic.

8. The method of claim 7, wherein the logical partition of the server is divided into a plurality of WPARs, and wherein each of the plurality of WPARs and the WPAR manager share a common operating system of the logical partition to perform their corresponding operations.

9. The method of claim 7, wherein authenticating comprises comparing a key stored by the WPAR manager and a key sent by the requesting WPAR.

10. The method of claim 7, further comprising authenticating the request from the requesting WPAR.

11. A computer program product comprising a non-transitory computer useable medium storing a computer readable program, wherein the computer readable program when executed on a computer causes the computer to:
    receive by a Working load Partition (WPAR) manager of the computer, a request from a requesting WPAR of a plurality of WPARs of a logical partition of the server, to perform a memory transaction;
    connect the requesting WPAR through a virtual port assigned to the WPAR and connected to a Virtual I/O Server (VIOS) using Node Port Identification Virtualization (NPIV) protocol, to a physical storage to give the requesting WPAR private access to the physical storage;
    perform the memory transaction between the WPAR and the physical storage via the virtual port assigned to the WPAR; and
    authenticate the request from the requesting WPAR, wherein authenticating the request from the requesting WPAR comprises authenticating a key value submitted by the requesting WPAR with the request against stored key values for the plurality of WPARs of the server, and wherein the memory transaction is performed only in response to the authentication of the request resulting in the requesting WPAR indicating that the requesting WPAR is authentic.

12. The computer program product of claim 11, wherein authenticating comprises comparing a key stored by the WPAR manager and a key sent by the requesting WPAR.

13. The computer program product of claim 11, wherein each of the plurality of WPARs and the WPAR manager share a common operating system of the logical partition to perform their corresponding operations.

14. The computer program product of claim 11, wherein the computer readable program further causes the computer to create by execution of software a Virtual Fiber Channel (VFC) adapter associated with a virtual port identification, wherein each of the WPARs in the plurality of WPARs is associated with a separate unique virtual port, and wherein each of the separate unique virtual ports associated with the WPARs is associated with the virtual port identification of the VFC.

15. The computer program product of claim 11, wherein the computer readable program further causes the computer to create by execution of software a server adapter in communication with a Virtual Fiber Channel (VFC) adapter, wherein the server adapter is associated with the virtual portion identification of the VFC, and wherein the server adapter communicates data between the VIOS and a physical adapter coupled to the physical storage.

* * * * *